Nov. 17, 1936.    F. E. GARBUTT ET AL    2,061,069
AUTOMATIC LIGHT CHANGER
Filed March 10, 1934    6 Sheets-Sheet 1

Fig. 1.

INVENTORS:
Frank E. Garbutt,
Thomas M. Ingman,
Harry G. Cunningham,
BY
ATTORNEY.

Nov. 17, 1936.  F. E. GARBUTT ET AL  2,061,069
AUTOMATIC LIGHT CHANGER
Filed March 10, 1934     6 Sheets—Sheet 3

INVENTORS:
Frank E. Garbutt,
Thomas M. Ingman,
Harry G. Cunningham,
BY
ATTORNEY.

Nov. 17, 1936.  F. E. GARBUTT ET AL  2,061,069
AUTOMATIC LIGHT CHANGER
Filed March 10, 1934  6 Sheets-Sheet 4

INVENTORS:
Frank E. Garbutt,
Thomas M. Ingman,
Harry G. Cunningham,
BY

ATTORNEY.

Nov. 17, 1936.  F. E. GARBUTT ET AL  2,061,069
AUTOMATIC LIGHT CHANGER
Filed March 10, 1934   6 Sheets-Sheet 5

INVENTORS:
Frank E. Garbutt,
Thomas M. Ingman,
Harry G. Cunningham
BY
Ford W Lewis
ATTORNEY Nov. 17, 1936.  F. E. GARBUTT ET AL  2,061,069
AUTOMATIC LIGHT CHANGER
Filed March 10, 1934  6 Sheets-Sheet 6

INVENTORS:
Frank E. Garbutt,
Thomas M. Ingman,
Harry G. Cunningham,
BY
ATTORNEY.

Patented Nov. 17, 1936

2,061,069

UNITED STATES PATENT OFFICE 2,061,069

AUTOMATIC LIGHT CHANGER

Frank E. Garbutt, Thomas M. Ingman, and Harry G. Cunningham, Los Angeles, Calif.

Application March 10, 1934, Serial No. 714,990

20 Claims. (Cl. 95—75)

Our invention relates to photographic devices, and relates in particular to printers for motion picture film wherein positive films are printed from negative films by passing lights from the negative films to the positive films.

Owing to the varying conditions and intensities of light encountered in the photographing of motion picture negatives from scenes or actions comprising a photoplay, it is necessary in printing a positive film to employ different intensities of printing light for the scenes of a motion picture negative. This is accomplished in various ways, such as by varying the volume of light, the intensity of the light rays in a light beam, or the size of the aperture through which light rays of a given intensity are permitted to pass. Various types of printers are now in use having perforate means which may be adjusted prior to a light change to correspond to the new printing light to be employed in a succeeding scene or section of film. Our invention is concerned with means for automatically changing the printing light throughout the printing of a positive from a negative or vice versa.

It is an object of our invention to provide a printing device for a motion picture film having a light changing element, means for quickly actuating the light changing element to a new condition or position of operation, and a preset or preoperating means for predetermining the light change prior to the actuation of the light changing means without interfering with the printing light used at the time the presetting mechanism is automatically adjusted for the succeeding printing light value.

It is a further object of the invention to provide a simple and efficient automatic presetting attachment which may be secured to standard types of film printers having light change presetting devices thereon, thereby eliminating the present manual presetting operation and its accompanying liability of error.

It is a further object of the invention to provide a presetting device of the character set forth in the preceding paragraph which may be conveniently adapted to those types of printers in which the printing light is varied by changing the size of a light aperture.

It is a further object of the invention to provide an automatic presetting device of the above character which may be employed in conjunction with a film printer having cooperating cam means which are forced yieldably together in such a manner that the following member of the cam means moves into a position corresponding to the position of the leading cam means when such following cam means is released.

A further object of the invention is to provide a presetting device for use in conjunction with light changes having an actuating means consisting of a plurality of individual cams which are adapted to be individually moved in a preselected order into engagement with a part connected to the light controlling means.

It is a further object of the invention to provide a photographic printer having an automatic light changing device and an indicator for showing the light changes produced by the automatic light changer.

It is a further object of the invention to provide in a device of the above character means for controlling the changes in printing light and a novel means for motivating such cam means in a preselected order.

It is a further object of the invention to provide an automatic light changer having means for permitting operation of the printer with which it is connected when the controlling element of the light changer is not in starting position, and also having means for stopping the printer automatically at the end of the printing operation.

A further object of the invention is to provide an automatic film printer which may be operated in either forward or reverse direction, thereby avoiding the necessity of rewinding the negative films each time a positive film is printed therefrom.

Further objects and advantages of the invention will be brought out in the following part of the specification.

Referring to the drawings which are for illustrative purposes only.

Figure 1:
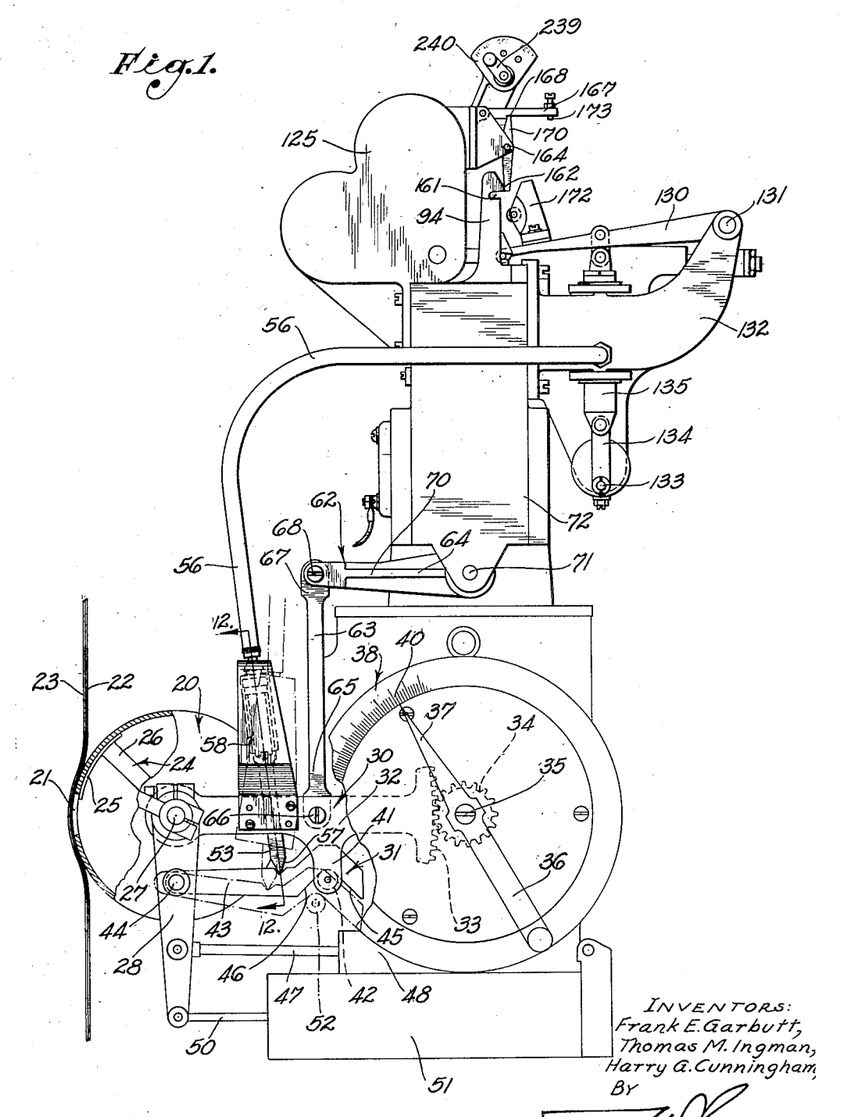
Fig. 1 is an elevational view showing a preferred embodiment of our invention secured to an automatic printer.

In the preferred form of our invention shown in Fig. 1, 20 indicates a lamp housing of a standard form of printer having a light aperture 21 across which a pair of films 22 and 23 is continuously moved by use of film moving mechanism of well-known form, and therefore not illustrated herein for the reason that our invention is in no way concerned with the manner in which the films are moved relative to a light aperture. Operating in conjunction with the aperture 21 is a light control means 24 including a gate 25 mounted on an arm 26 which is secured to a shaft 27, extending through one end of the lamp housing 20 and having a lever 28 mounted on the outer end thereof. By moving the lever 28 the light control means 24 may be actuated to move the gate 25 relative to the aperture 21 whereby to change the effective area of the aperture through which light may pass from the lamp housing 20 to the films 22 and 23. The light control means 24 also includes a preset mechanism and may consist of a leading preset means 30 and a following preset means 31. The leading preset means 30 consists of a vertically swingable arm 32 pivoted axially relative to the shaft 27 and having a gear segment 33 near its outer or rightward end adapted to be engaged by a gear 34 mounted on a shaft 35 equipped with a lever or handle 36 and a pointer 37 adapted to traverse a scale or dial 38 having graduations 40 indicating various light values. Brackets 41 extending downwardly from the arm 32 carry a leading preset member proper or roller 42. The following preset member consists of an arm 43 pivoted at 44 to the lever 28 and having converging faces 45 and 46 engaging the roller 42 of the leading preset means 30. When the roller 42 is in the apex of the converging faces 45 and 46 the arm 28 and the lever 32 will have a definite angular relationship. Therefore, by forcing downwardly on the member 31 the cam faces 45 and 46 are caused to centralize relative to the roller 42, and should the roller 42 be out of the apex formed by the faces 45 and 46, the arm 43 will move in a desired direction until centralization of the roller 42 with the faces 45 and 46 is accomplished, thereby swinging the lever 28 into a predetermined angular relationship relative to the arm 32. For holding the lever 28 against movement in either direction a bar 47 is projected into a clutch mechanism 48, preferably of electrically-actuated type, and to control the speed of movement of the lever 28 a rod 50 is extended therefrom into a dashpot 51. By turning the handle 36 it is possible to raise or lower the rightward end of the arm 32, and if the clutch 48 is gripping the rod 47 the movement of the arm 32 will not produce a corresponding movement of the lever 28.

Assuming that the roller 42 is swung downwardly into the position indicated by dotted lines 52, and that the clutch 48 is holding the lever 28 against movement, the lever 43 will swing downwardly around the pivot 44 but the face 46 thereof will not move leftwardly the same distance as the roller 52, and accordingly the roller 42 will not rest in the apex formed by the faces 45 and 46 but will rest against the face 46. It is customary to employ notches in the edge of the negative film and an electric switch actuated by such notches to release the clutch 48; therefore, when the clutch 48 is in this manner released, the downward pressure against the lever 43 will cause the face 46 to move downwardly and leftwardly relative to the roller 42 until the roller also engages the face 45 and a centralization of the faces 45 and 46 relative to the roller 42 is accomplished together with a leftward movement of the lever 28 into cooperative position relative to the arm 32. The movement of the lever 32 in this manner produces a movement of the gate 25 relative to the aperture 21.

Figures 4, 12:
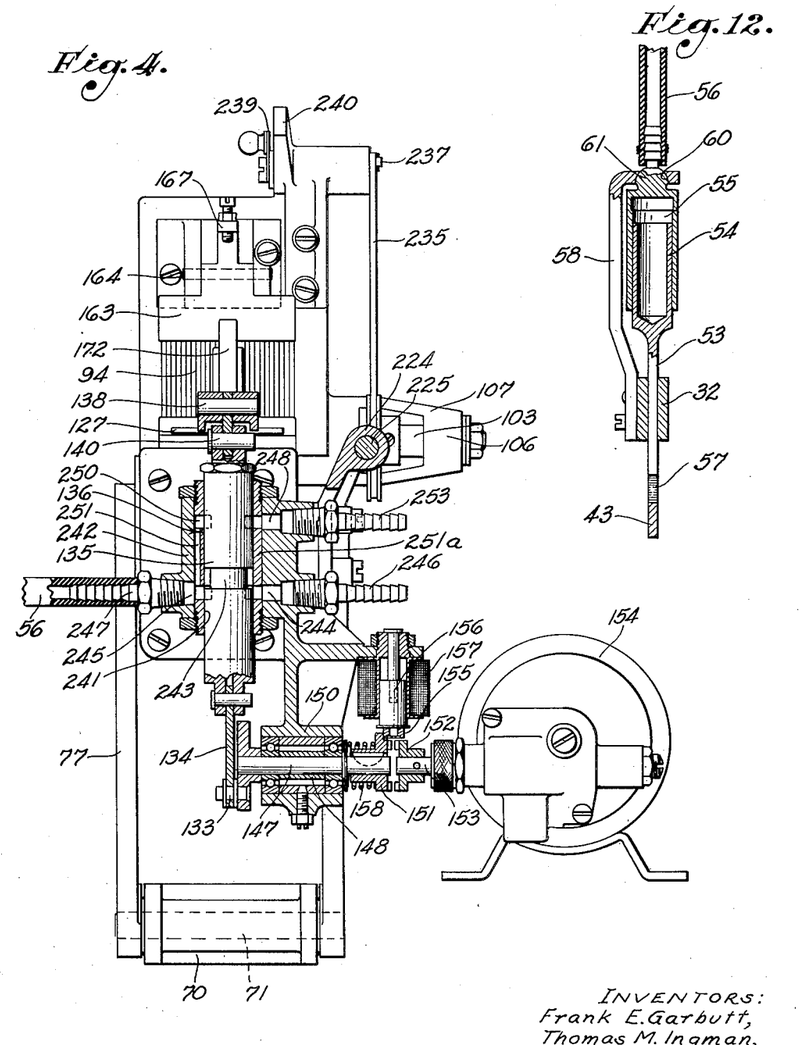
Fig. 4 is a vertical section on a plane represented by the line 4—4 of Fig. 2.
Fig. 12 is an enlarged section taken as indicated by the line 12—12 of Fig. 1.

The parts above described are now in use in presetting-type light changers and we do not claim the invention thereof except as such parts may enter into our new combination. For forcing downwardly on the lever 43 we provide an exerting means including a pressure member 53 which, as best shown in Fig. 12, has a piston 54 on its upper end received in a cylinder 55 which is connected to an air tube 56 through which air under pressure may be introduced into the cylinder 55 to force the member 53 downwardly and transmit such force or pressure through a point 57 at its lower end to the member 43. A bracket 58 is secured to the arm 32 and has a socket 60 formed at its upper end to receive a ball 61 on the upper end of the cylinder 55.

Our new pressure exerting means, including the member 53 and the cylinder 55, makes it possible to release the member 43 from pressure after each change in the position of the lever 28 has been made, thereby relieving the arm 43 of forces tending to resist its movement into a new position. In the description of the parts 30 and 31 we have employed the terms "leading" and "following means" in view of the fact that the means 30 is moved into a position corresponding to an intended change of light and thereby serves as a means for leading the part 31 to a new position when the electric clutch 48 is released.

Our invention provides a means for automatically moving the leading member 30 into successive positions corresponding to successive intended light changes, and in accordance with this principle we have shown a mover 62 comprising a link 63 and a bell-crank 64, the link 63 having its lower end 65 pivotally secured by means of a screw 66 to the arm 32 of the leading preset means 30 and having its upper end 67 pivotally secured by means of a screw 68 to the leftward or outer end of a horizontal arm 70 forming part of the bell-crank 64. The bell-crank 64 is mounted on a horizontal shaft 71 held in the lower end of a casing 72 which may be secured in any desired manner to the film printer.

Figure 2:
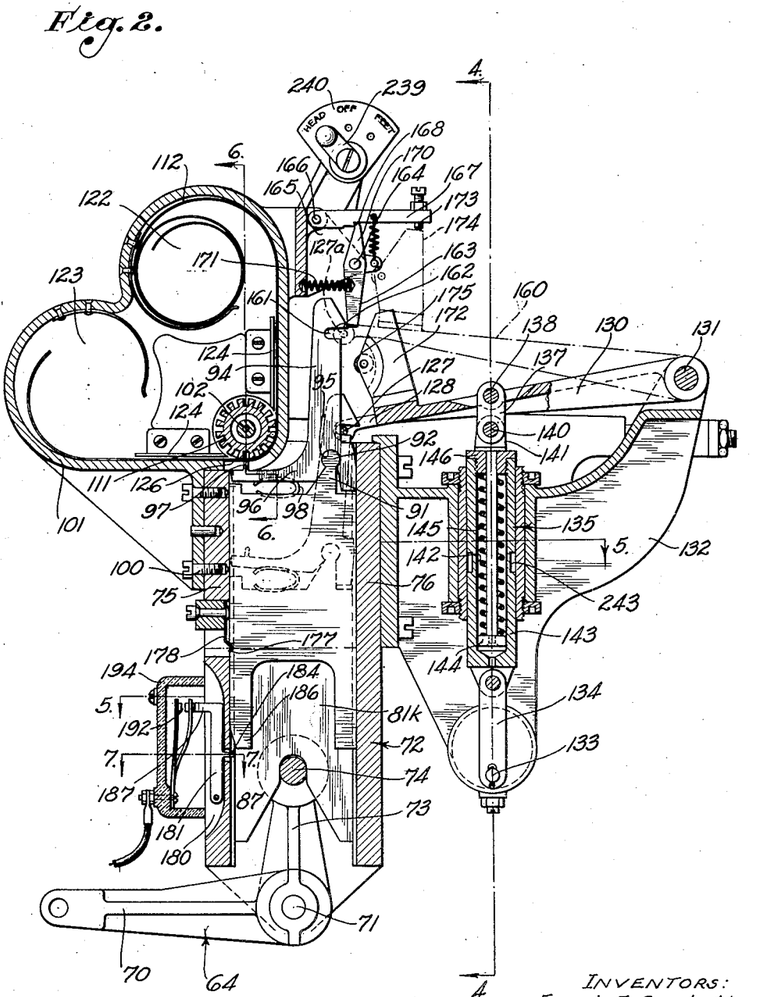
Fig. 2 is an enlarged vertically cross-sectioned view of the upper portion of our device.
Figure 5:
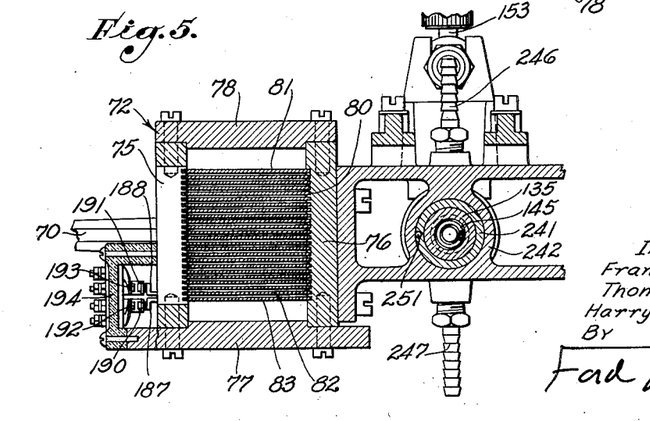
Fig. 5 is a cross-section taken as indicated by the line 5—5 of Fig. 2.

As shown in Fig. 2, the bell-crank 64 may include a pair of upwardly extending arms 73 which support a horizontal bar or cam follower 74. As shown in Fig. 5, the casing 72 is of rectangular cross-section and is formed from side walls 75 and 76 and front and back walls 77 and 78. In the side walls 75 and 76 vertical grooves 80 are cut so as to form vertical slides adapted to receive the edges of cam plates 81, 82, and 83. There are twenty-two of the plates 81 to correspond to the number of light values customarily employed in motion picture film printing devices and one each of the plates 82 and 83.

Figures 9, 13:
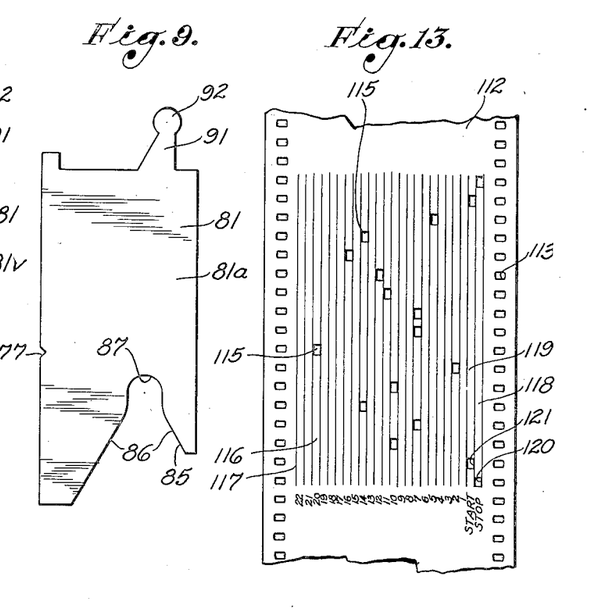
Figs. 9 and 10 are face views of the first and last control plates employed in the invention.
Fig. 13 is a face view of a control means employed in the device to control the operation of the automatic light changer.
Figure 10:
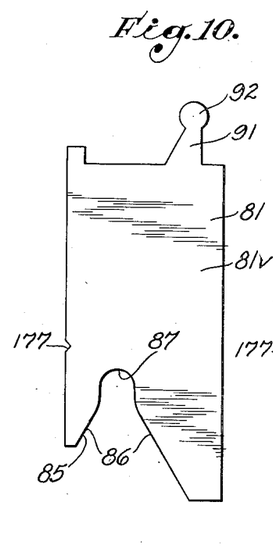
Figure 11:
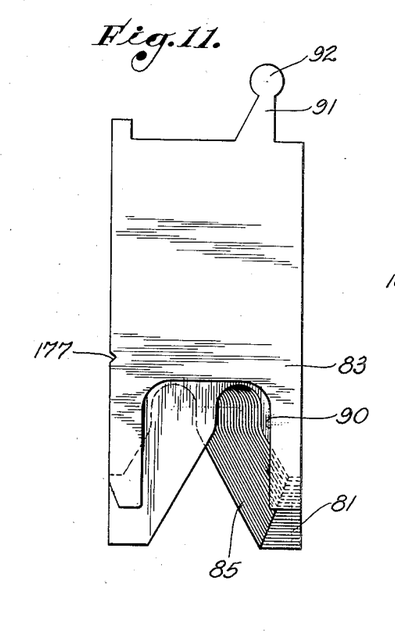
Fig. 11 is a face view of the entire battery or complement of control plates.

As shown in Figs. 2, 9, 10, and 11 the plates 81 have V-shaped notches 85 and the lower ends thereof are formed by upwardly converging walls 86 which lead to semi-circular pockets 87 which are of a width corresponding to the diameter of the shaft or follower 74 of the mover 62. In Fig. 9 the face of the plates 81 is shown, which may be designated specifically as 81a, and in Fig. 10 the last of the plates 81 is shown and is designated as 81v. The pocket 87 of the plate 81a is near the rightward edge thereof and is in such position that when the follower 74 rests therein the bell-crank 64 will be rotated in clockwise direction and the arm 32 will be raised to one extreme position, and the plate 81v, shown in Fig. 10, has its pocket 87 near the leftward edge thereof so that when the follower 74 is in such pocket 87, the bell-crank 64 will be rotated to its extreme leftward position and the arm 32 will be lowered to its other extreme position. The plates 81 between the plates 81a and 81v have the pockets 87 therein graduated or offset, as shown in Fig. 11, from the extreme shown by the pocket 87 of the plate 81a in Fig. 9 to the opposite extreme shown by the pocket 87 in the plate 81v of Fig. 10. Therefore, by moving a selected plate 81 downwardly into engagement with the follower 74, the bell-crank 64 may be moved into a desired position corresponding to a desired light value, and such movement of the bell-crank 64 will be transmitted through the link 63 to the arm 32 to move the arm 32 to a corresponding preset position for a desired value of light to be delivered through the aperture 21.

In Fig. 2 an intermediate plate 81, which may be designated as 81k, is shown in lowered position and with the pocket 87 thereof in engagement with the shaft or follower 74, thereby holding the bell-crank 64 and the arm 32 of the leading preset means 30 in a centralized position such as shown in Fig. 1. The plates 82 and 83 do not engage the follower 74 and accordingly are shown with notches 90 therein of sufficient size to clear the follower 74 in either of its extreme positions. Each of the plates 81, 82, and 83 has an arm 91 projecting upwardly therefrom surmounted by a cylindrical or circular member 92 which serves in the capacity of a ball in a ball-and-socket combination. As shown in Fig. 2, a plurality of latch levers 94 are mounted on the cylindrical members 92 and are provided with circular notches 95 adapted to fit over the cylindrical members 92. Extending leftwardly from the lower ends of the latch levers 94 are arms 96, each of which arms has an upwardly projecting pin 97 formed near its leftward or outer end, and between each arm 96 and the plate 81, 82 or 83, to which it is attached, a spring 98 is placed which tends to rotate the latch lever 94 in rightward or clockwise direction.

By means of screws 100 a casing 101 is secured to the upper end of the wall 75 in a position to project part way over into the upper portion of the casing 72, as shown in Figs. 1 and 2. In the lower right-hand corner of the casing 101 is a horizontal shaft 102 which is vertically aligned with the pins 97 formed on the arms 96. The rearward end 103 of the shaft 102 projects through a bearing 104 in the rear wall 105 of the casing 101 and also extends within an outboard bearing 106 supported by arms 107. Within the casing 101 sprockets 108 are mounted on the shaft 102 and between the sprockets 108 a drum 110 is extended, this drum having longitudinal slots 111 therein which are preferably equally spaced circumferentially, and the sprockets 108 and the drum 110 are tied together so as to rotate with the shaft 102 as a single unit. The invention employs chart or control means which is preferably in the form of a paper strip 112 which, as shown in Fig. 13, has sprocket holes 113 near the edges thereof adapted to be engaged by teeth of the sprockets 108. The member 112 is adapted to have indications or indicating means for controlling the operation of the presetting mechanism, these indications being in the form of holes 115 which are placed in longitudinal paths 116 defined by lines 117.

As shown in Fig. 13, the first two paths 118 and 119 are for stop-and-start indications or controls in the form of openings 120 and 121. The remainder of the paths 116 are numbered from 1 to 22 corresponding to the standard number of light values employed in printing devices and these paths are aligned with the pins 97 associated with the respective plates 81.

As shown in Fig. 2, the casing 101 has cylindrical spaces 122 and 123 in which the curled or rolled ends of the strip 112 may be placed, and as further shown in this figure, the strip 112 is guided to the sprockets 108 and drum 110 by guide plates 124. The strip 112 may be placed in and removed from the casing 101 by removing the front cover 125 thereof, and when the strip is properly placed, as shown in Fig. 2, a portion 126 thereof is disposed in a position to prevent upward movement of the pins 97 on the arms 96, thereby holding the member 94 in the position in which it is shown in full lines in Fig. 2. When the drum 110 is rotated to bring one of the openings 115, 120 or 121 into alignment with a pin 97, such pin may then move upwardly through the opening with the result that the spring 98 associated with the arm 96 on which the pin is formed, may be swung upwardly to rotate the associated lever 94 in rightward direction. Near the upper ends of the levers 94, rightwardly directed notches 161 are formed which are adapted to engage a horizontal bar 127 which extends between the bifurcated ends 128 of a lever arm 130 which is pivoted on a horizontal shaft 131 mounted on a bracket 132 secured to the side wall 76 of the casing 72. The lever arm 130 forms a part of a motivating means for the plates 81 and is adapted to be moved through a prescribed path of movement by means of a crank 133, a link 134 and a cushioned cross-head 135 which also constitutes the movable element of an air control valve 136, and an upper link 137 which is pivotally connected at 138 to the lever 130 and at 140 to a stem 141 which extends into a bore 142 formed in a cylindrical body 143 constituting part of the cross-head 135. A head 144 is secured to the lower end of the stem 141, and a compression spring 145 is placed around the stem 141 between the head 144 and a plug 146 which closes the upper end of the bore 142.

As best shown in Fig. 4, the crank 133 is mounted on a shaft 147 carried in a rotor bearing structure 148 which in turn is supported in the lower part 150 of the bracket 132. The rearward end of the shaft 147 has a slidable clutch member 151 thereon adapted to engage a rotating clutch member 152 mounted on a shaft 153 adapted to be continuously rotated by a motor 154. The movable clutch member 151 is normally held in retracted position, as shown in Fig. 4, by a stop 155 secured to the lower end of an armature 156 slidably mounted within a solenoid 157. When the solenoid 157 is energized, the lifting of the armature 156 raises the stop 155 from engagement with the clutch member 151 and allows a spring 158 to move the clutch member 151 in rightward direction into engagement with the rotating clutch member 152, whereupon the clutch member 152 will rotate the clutch member 151 through a movement of 360° or a single revolution, the stop 155 engaging the clutch member 151 at this time and removing it from engagement with the clutch member 152 at the end of a single rotation. Accordingly, each time the clutch mechanism, represented by the parts 151 and 152, is actuated, the motivating means including the arm 130 is moved upwardly from the position in which it is shown in full lines in Fig. 2 to the position shown by dotted lines 160, and then is returned to the lowered position in which it is shown in full lines.

As further shown in Fig. 2, each of the levers 94 has rightwardly directed notches 161 in a horizontal plane in which the bar 127 stops at the upper end of the upward movement of the arm 130, and the upper wall 162 of each slot projects forwardly or rightwardly to form a projecting hook or abutment which projects rightwardly over the bar 127 when it is in raised position as shown at 127a. During the time that the lever 130 is in lowered position, the levers 94 are kept from moving rightwardly by a fulcrumed plate 163 mounted on a horizontal shaft 164 supported in a bracket 165 which extends rightwardly from the upper portion of the casing 101. On a shaft 166, also carried in the bracket 165, a catch lever 167 is mounted in such position that a shoulder 168 thereon will engage the upper end 170 of the plate 163 and prevent it from moving in anticlockwise direction under the force applied at the lower end thereof by a compression spring 171. Extending upwardly from the leftward end of the arm 130 is a bracket or projection 172, which is adapted to engage an adjustment screw 173 in the rightward or outer end of the lever 167, as indicated by dotted lines 174, when the arm 130 is in raised position. Therefore, the lever 130 releases the latch lever 167 when it is in raised position and when the cross-bar 127 is in the horizontal plane defined by the notches 161 in the upper ends of the levers 94, and the plate 162 is swung in anti-clockwise direction until the lower end thereof engages a roller 175 mounted in the leftward portion of the bracket 172. If at this time a hole 115, 120 or 121 in the chart or control strip 112 is in a position to receive a pin 97, such pin will pass upwardly through the hole and allow the lever 94 with which it is associated to swing rightwardly and the notch 161 thereof will engage the bar 127 in its raised position 127a, and as the lever 130 moves the bar 127 downwardly, such movement will be transmitted through this lever 94 to the plate 81 with which it is connected and the plate 81 will be moved into lowered position, the cam formation at the lower end thereof actuating an associated part of the mechanism.

In Fig. 2, one of the intermediate plates 81, such as the plate 81k, is shown held in lowered position, the substantially centralized pocket 87 thereof engaging the bar 74 of the moving means 62 and holding it in a substantially centralized position, as previously described. As the arm 130 moves downwardly, the roller 175 thereof moves the plate 163 in clockwise direction and returns it to the position in which it is shown in Fig. 2, the shoulder 168 of the latch lever 167 reengaging the upper end 170 and retaining it in this position until it is again released by an upward movement of the motivating means represented by the arm 130. Each of the plates 81 has a notch 177 which is adapted to be engaged by an individual spring 178 mounted in the wall 75 of the casing 72, and the plates 81 are thereby yieldably held in raised position.

Figure 14:
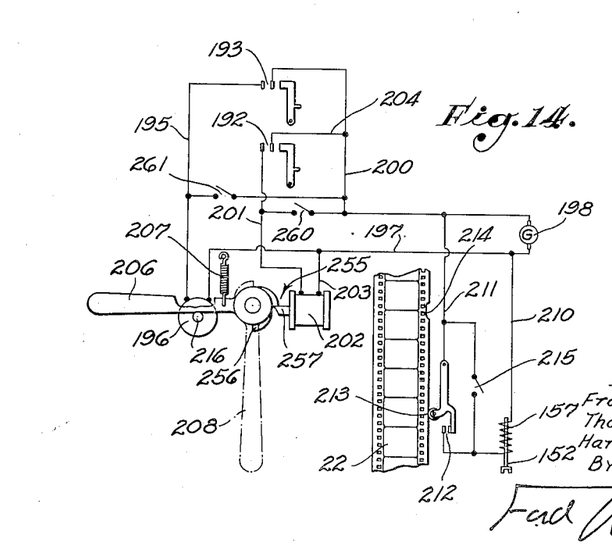
Fig. 14 is a wiring diagram showing the manner in which the stop-and-start switches of the device may be connected so as to control the stopping and starting operation of a presetting motion picture film printer of the character disclosed herein.

As shown in Figs. 2, 5, 7, and 8, the wall 75 has a slot 180 in the lower portion thereof, and in this slot, switch actuating levers 181 and 182 are mounted on a pin 183 in such position that fingers 184 projecting rightwardly therefrom will lie in the paths of the lower ends 186 of the start-and-stop plates 82 and 83. The upper ends of the levers 181 and 182 have outwardly projecting arms 187 and 188 adapted to engage movable switch contacts 190 and 191 of switches 192 and 193 which are mounted in a molded casing 194 of bakelite or other dielectric material. As shown in Fig. 14, the switch 193 is connected through a wire 195 with a starting control magnet 196, and from the magnet 196 a wire 197 is carried to a source of electric energy 198 such as a generator, this generator being also connected to the switch 193 through a wire 200. The switch 192 is connected through a wire 201 with a stop magnet 202 which in turn is connected with the generator 198 through a wire 203, the switch 192 being also connected to the generator 198 through a wire 204.

In Fig. 14, we have shown a control lever 206 of the character employed in the type of printer with which our invention is here disclosed. This lever 206 is ordinarily held in off-position, such as shown in full lines, by means of a spring 207, and may be moved manually to the on-position, indicated by dotted lines 208, to throw in a driving clutch forming part of the printer. As further shown in Fig. 14, one side of the solenoid 157 is connected through a wire 210 with a source of electric energy, such as the generator 198, and the other side or terminal of the solenoid 157 is connected with a generator 198 through a conductor 211 having a switch 212 therein associated with a member 213 adapted to engage the edge of the negative 22, which, in accordance with customary practice, has notches 214 which permit movement of the member 213 and a consequent continuous or temporary closing of the switch 212 as the notch 214 coincides with and passes the member 213. The circuit including the solenoid 157 may be manually closed through use of a button switch 215 which is bridged across the switch 212.

The starting control magnet 196 is equipped with a stop 216 which ordinarily engages the lever 206 and prevents its being moved from off-position, as shown in full lines, to on-position, as shown in dotted lines 208. Accordingly, the printer cannot be started unless the control strip 112 is properly placed and positioned in the casing 101, or, in other words, with a starting hole 121 in a position to be engaged by the pin 97 associated with the start plate 82. In setting the printer to print a film from a negative or vice versa, the control strip 112 is placed in such position that the start opening 121 will receive the pin 97 associated with the plate 82. The button 215, Fig. 14, is then pressed, energizing the solenoid 157, raising the stop 155 and engaging the clutch parts 151 and 152, whereupon the motor 154 will turn the crank 133 through a single revolution and the arm 130 will be reciprocated through one cycle of movement. When it reaches its raised position, as indicated by dotted lines 160, the lever 94 associated with the plate 82 will swing rightwardly into engagement with the bar 127, and the bar 127 in its downward movement will carry the plate 82 into lower position, the lower end 186 of the plate 82 engaging the finger 184 and moving the lever 182 so as to close the switch 193. The closing of the switch 193 energizes the magnetic means 196 and withdraws the stop 216 so that the control lever 206 may be then moved by the operator from off-position to the on-position indicated by dotted lines 208.

Figure 3:
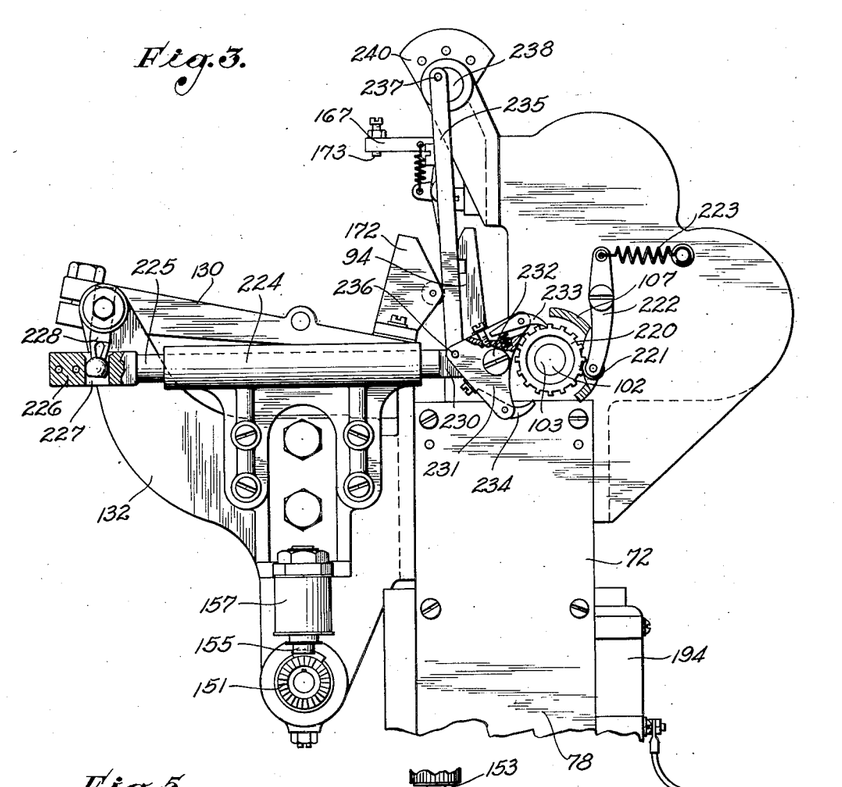
Fig. 3 is a rear view of the upper portion of the apparatus shown in Fig. 2.
Figure 6:
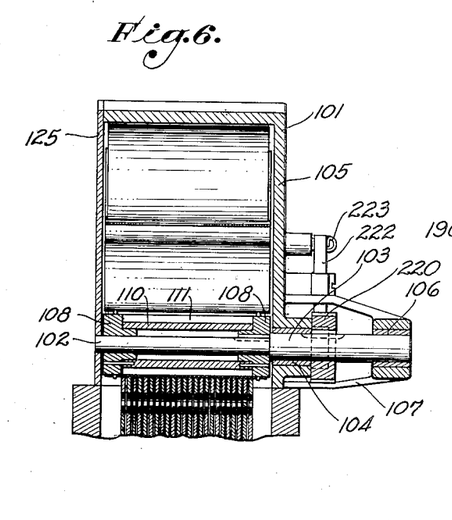
Fig. 6 is a fragmentary section taken as indicated by the line 6—6 of Fig. 2.
Figure 7:
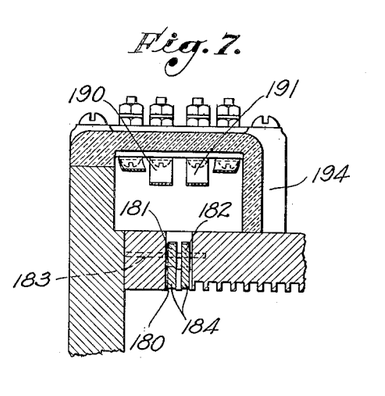
Fig. 7 is an enlarged fragmentary cross-section on a plane represented by the line 7—7 of Fig. 2.
Figure 8:
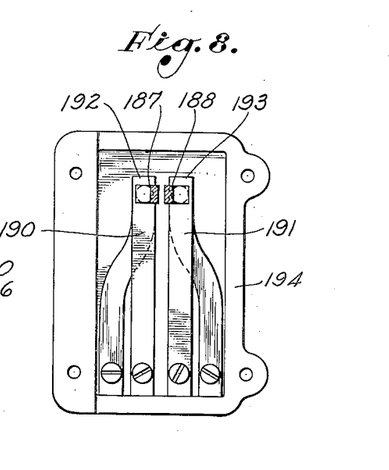
Fig. 8 is an elevational view looking at the inside of the stop-and-start switch shown in section in Fig. 7.

Mechanism is provided for advancing the drum 110 to a consecutive position each time the arm 130 is reciprocated so that a consecutive position of the control strip 112 will be presented to the fingers 97. As best shown in Figs. 3 and 6, a toothed wheel 220 is keyed to the outer portion 103 of the shaft 102, and for preventing free rotation of the toothed wheel 220, a detent roller 221 is mounted on a swingable arm 222 which is resiliently forced in clockwise direction by a spring 223. In a slide 224, mounted on the bracket 132, is a bar 225 having a head 226 with an opening 227 therein engaged by the lower end of an arm 228 which is connected to the arm 130. On the inner end 230 of the bar 225, a swingable latch head 231 is pivotally mounted by means of a screw 232, this latch head having a "forward" pawl 233 and a rearward pawl 234. By swinging the head 231, a selected pawl 233 or 234 may be caused to engage and actuate the toothed wheel 220, or if the head 231 is held in an intermediate position, neither of the pawls 233 or 234 will engage the wheel 220. For controlling the position of the head 231, we provide a link 235, the lower end of which is connected by means of a pin 236 to the head 231, the upper end of which is connected to a crank pin 237 mounted on a rotary member 238 carried in the upper portion of the bracket 165 and, as shown in Fig. 1, having a lever 239 which traverses an indicator plate 240 marked with positions of the lever 239 corresponding to "head", "off" or "foot" movement of the drum 110.

The advancing mechanism, just described, moves the control strip 112 intermittently in accordance with the actuation of the presetting mechanism which is in turn controlled by notches in the film from which the print is being made. The pressure exerting means for forcing the members 31 and 42 operatively together is fed with air under pressure through the hose 56 which leads from the valve 136. As clearly shown in Fig. 4, the valve 136 includes the cross-head 135 which slides in a sleeve or cylinder 241 mounted in a cylindrical wall 242 forming a part of the bracket 132. When the member 135 is in lowered position, a peripheral channel 243 therein connects an inlet valve opening 244 with an outlet valve opening 245, the inlet valve opening 244 being supplied with air under suitable pressure through a fitting 246, and the outlet valve opening 245 being connected through a fitting 247 with the hose 56 so that whenever the member 135 is in lowered position, the plunger or piston 54 will force downwardly against the member 31 and cause it to be forcibly applied to the roller 42. When the member 135 is moved upwardly during the actuation of the motivating means, the channel 243 connects an air outlet passage 248 with a port 250 connected with the passage 245 through a vertical passage 251 formed in the sleeve or cylinder 251a, thus the raising of the member 135 shuts off the air entering through the passage 244 and permits the air under pressure in the hose 56 and the cylinder 55 to be released through the discharge passage 248 which may be connected through a fitting 253 with a discharge hose, not shown. Accordingly, during the movement of the cam plates 81 into engagement with the member 74 of the mover 62, and consequently during the movement of the arm 32 into a new preset position, very little or no pressure will be exerted to force the member 31 against the roller 42, and with the result that all strain is taken from these parts during the time they are being adjusted to new positions of operation.

With the above explanation of the operation of the various parts in view, it will be understood that swinging of the lever 206, Fig. 14, from off-position to on-position 208 will start the film advancing mechanism of the printer and the printing film and the film strip to be printed will be moved across the printing aperture 21. The control lever 206 will be held in on-position by engagement of a latching means 255 including a dog or abutment 256 associated with the lever 206, as by being formed on the hub thereof, and an engager 257 adapted to be retracted in response to the energization of the magnet 202, this magnet being energized by the stop switch 192 when the end of the control strip 112 is reached, then retracting the member 257 and permitting the spring 207 to return the lever 206 to off-position.

The control notches 214 on the film from which a print is being made will consecutively actuate the automatic presetting mechanism above described and when the end of the film is reached, the device will be stopped in consequence of the alignment of a stop opening 120 with the pin 97 associated with the stop plate 83. The film which has been printed will be replaced by a new film and the direction of the mechanism may be reversed by properly adjusting the lever 239 to give the desired direction of movement of the control strip 112. The printer may be stopped and started manually by use of button switches 260 and 261 which are connected in parallel with the respective switches 192 and 193 so that the magnets 202 and 196 may be energized independently of the automatic control switches 192 and 193.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

We claim as our invention:

1. An automatic presetting device for use with a photographic device having a film and motivating means therefor, a light control, a leading preset member, and a following preset member, including: chart means having indications of light changes thereon; a mover for moving said leading member from one position to another; actuating means operating under control of said indications of said chart means to move said mover so as to carry said leading member into different positions in accordance with said indications of said chart means; and means for producing a relative advancing movement between said chart means and said actuating means whereby consecutive parts of said chart means are caused to cooperate with said actuating means in accordance with the movement of said film.

2. An automatic presetting device for use with a photographic device having a film and motivating means therefor, a light control, a leading preset member and a following preset member, including: chart means having indications of light changes thereon; a mover for moving said leading member from one position to another; actuating means controlled by said chart means and connected to said mover, for actuating said mover to carry said leading member into the consecutive positions determined by said indications, said actuating means including a plurality of cams adapted to engage and move said mover to different positions, said cams being normally disposed in retracted positions and being conditioned by said indications of said chart means for movement to actuate said mover, and means for moving such of said cams as have been conditioned for movement whereby to produce actuation of said mover; and means for producing a relative advancing movement between said chart means and said actuating means whereby consecutive parts of said chart means are caused to cooperate with said actuating means in accordance with the movement of said film.

3. An automatic presetting device for use with a photographic device having a film and motivating means therefor, a light control, a leading preset member and a following preset member, including: chart means having indications of light changes and the starting position of said chart means thereon; a releasable stop for preventing operation of said photographic device; a mover for moving said leading member from one position to another; actuating means controlled by said chart means and connected to said mover, for releasing said releasable stop and actuating said mover to carry said leading member into the consecutive positions determined by said indications; and means for producing a relative advancing movement between said chart means and said actuating means whereby consecutive parts of said chart means are caused to cooperate with said actuating means in accordance with the movement of said film.

4. An automatic presetting device for use with a photographic device having a film and motivating means therefor, a light control, a leading preset member and a following preset member, including: chart means having indications of light changes and the starting position of said chart means thereon; a releasable stop for preventing operation of said photographic device; a mover for moving said leading member from one position to another; actuating means controlled by said chart means and connected to said mover, for releasing said releasable stop and actuating said mover to carry said leading member into the consecutive positions determined by said indications, said actuating means including a plurality of cams adapted to engage and move said mover to different positions, said cams being normally disposed in retracted positions and being conditioned by said indications of said chart means for movement to actuate said mover, and means for moving such of said cams as have been conditioned for movement whereby to produce actuation of said mover; and means for producing a relative advancing movement between said chart means and said actuating means whereby consecutive parts of said chart means are caused to cooperate with said actuating means in accordance with the movement of said film.

5. An automatic presetting device for use with a photographic device having a film and motivating means therefor, a light control, a leading preset member and a following preset member, including: chart means having indications of light changes and stop-and-start positions thereon; releasable means for preventing starting of said photographic device; stop means for stopping the operation of said photographic device; a mover for moving said leading member from one position to another; actuating means controlled by said chart means and connected to said mover, for releasing said releasable means, and actuating said mover to carry said leading member into the consecutive positions determined by said indications, and actuating said stop means; and means for producing a relative advancing movement between said chart means and said actuating means whereby consecutive parts of said chart means are caused to cooperate with said actuating means in accordance with the movement of said film.

6. An automatic presetting device for use with a photographic device having a film and motivating means therefor, a light control, a leading preset member and a following preset member, including: chart means having indications of light changes and stop-and-start positions thereon; releasable means for preventing starting of said photographic device; stop means for stopping the operation of said photographic device; a mover for moving said leading member from one position to another; actuating means controlled by said chart means and connected to said mover, for releasing said releasable means and actuating said mover to carry said leading member into the consecutive positions determined by said indications, and actuating said stop means, said actuating means including a plurality of cams adapted to engage and move said mover to different positions, said cams being normally disposed in retracted positions and being conditioned by said indications of said chart means for movement to actuate said mover, and means for moving such of said cams as have been conditioned for movement whereby to produce actuation of said mover; and means for producing a relative advancing movement between said chart means and said actuating means whereby consecutive parts of said chart means are caused to cooperate with said actuating means in accordance with the movement of said film.

7. An automatic presetting device for use with a photographic device having a film and motivating means therefor, a light control, a leading preset member, and a following preset member, including: chart means having indications of light changes thereon; a mover for moving said leading member from one position to another; actuating means operating under control of said indications of said chart means to move said mover so as to carry said leading member into different positions in accordance with said indications of said chart means; control means operated by said film for moving the cooperating parts of said leading and following preset members into operative engagement; and means for producing a relative advancing movement between said chart means and said actuating means whereby consecutive parts of said chart means are caused to cooperate with said actuating means in accordance with the movement of said film.

8. An automatic presetting device for use with a photographic device having a film and motivating means therefor, a light control, a leading preset member and a following preset member, including: chart means having indications of light changes and stop-and-start positions thereon; releasable means for preventing starting of said photographic device; stop means for stopping the operation of said photographic device; a mover for moving said leading member from one position to another; actuating means controlled by said chart means and connected to said mover, for releasing said releasable means and actuating said mover to carry said leading member into the consecutive positions determined by said indications, and actuating said stop means; control means operated by said film for moving the cooperating parts of said leading and following preset members into operative engagement; and means for producing a relative advancing movement between said chart means and said actuating means whereby consecutive parts of said chart means are caused to cooperate with said actuating means in accordance with the movement of said film.

9. An automatic presetting device for use with a photographic device having a film and motivating means therefor, a light control, a leading preset member and a following preset member, including: chart means having indications of light changes and stop-and-start positions thereon; releasable means for preventing starting of said photographic device; stop means for stopping the operation of said photographic device; a mover for moving said leading member from one position to another; actuating means controlled by said chart means and connected to said mover, for releasing said releasable means and actuating said mover to carry said leading member into the consecutive positions determined by said indications, and actuating said stop means; control means operated by said film for moving the cooperating parts of said leading and following preset members into operative engagement; and means acting in consequence of the actuation of said control means to produce a step-by-step movement between said chart means and said actuating means whereby consecutive parts of said chart means are caused to cooperate with said actuating means in accordance with the movement of said film.

10. An automatic photographic device having means for moving a film, including: a light control; a leading preset member and a following preset member, one of said members being connected to said light control; chart means having indications of light changes thereon; actuating means operating under control of said indications of said chart means to move said leading preset member into different positions in accordance with said indications of said chart means; and an indicator for showing the positions into which said leading preset member has been moved by said actuating means.

11. An automatic photographic device having means for moving a film, including: a light control; a leading preset member and a following preset member, one of said members being connected to said light control; automatic means for moving said leading preset member; an indicator for showing the positions into which said leading preset member has been moved by said automatic means; means for applying pressure to move said preset members into operative engagement; and means for releasing the pressure of said pressure means during the time said leading preset member is being moved by said automatic means.

12. An automatic photographic device having means for moving a film, including: a light control; a leading preset member and a following preset member, one of said members being connected to said light control; automatic means for moving said leading preset member; means for applying pressure to move said preset members into operative engagement; and means for releasing the pressure of said pressure means during the time said leading preset member is being moved by said automatic means.

13. An automatic photographic device having means for moving a film, including: a light control; a leading preset member and a following preset member, one of said members being connected to said light control; adjusting means for moving said leading preset member; an indicator for showing the positions into which said leading preset member has been moved by said adjusting means; means for applying pressure to move said preset members into operative engagement; and means for releasing the pressure of said pressure means during the time said leading preset member is being moved by said adjusting means.

14. An automatic photographic device having means for moving a film, including: a light control; a leading preset member and a following preset member, one of said members being connected to said light control; adjusting means for moving said leading preset member; means for applying pressure to move said preset members into operative engagement; and means for releasing the pressure of said pressure means during the time said leading preset member is being moved by said adjusting means.

15. An automatic presetting device for use with a photographic device having a film and motivating means therefor, a light control, a leading preset member and a following preset member, including: chart means having indications of light changes thereon; a mover for moving said leading member from one position to another; actuating means controlled by said chart means and connected to said mover, for actuating said mover to carry said leading member into the consecutive positions determined by said indications, said actuating means including a motivating member adapted to be moved through a prescribed path, a plurality of cam means each cooperating with said mover in a manner to cause movement of said mover into a prescribed position, means for producing movement of said motivating means through said path of movement and means cooperating between said cam means and said indications of said chart means to cause engagement of one of said cam means with said motivating means whereby said motivating means will during its movement actuate said cam means in a manner to accomplish a movement of said mover; control means operated by said film for moving the cooperating parts of said leading and following preset members into operative engagement; and means for producing a relative advancing movement between said chart means and actuating means whereby consecutive parts of said chart means are caused to cooperate with said actuating means in accordance with the movement of said film.

16. An automatic presetting device for use with a photographic device having a film and motivating means therefor, a light control, a leading preset member and a following preset member, including: chart means having indications of light changes thereon; a mover for moving said leading member from one position to another; actuating means controlled by said chart means and connected to said mover, for actuating said mover to carry said leading member into the consecutive positions determined by said indications, said actuating means including a motivating member adapted to be moved through a prescribed path, a plurality of cam means each cooperating with said mover in a manner to cause movement of said mover into a prescribed position, means for producing movement of said motivating means through said path of movement and means cooperating between said cam means and said indications of said chart means to cause engagement of one of said cam means with said motivating means whereby said motivating means will during its movement actuate said cam means in a manner to accomplish a movement of said mover; and means for producing a relative advancing movement between said chart means and said actuating means whereby consecutive parts of said chart means are caused to cooperate with said actuating means in accordance with the movement of said film.

17. A device as defined in claim 16 in which said chart means comprises an elongated member having indications therein in the form of holes, and said means for producing engagement between said cam means and said motivating means comprises parts movably connected to said cam means, each of said parts having a pin adapted to extend into one of said holes in said elongated member.

18. A device as defined in claim 16 in which said cam means comprises a plurality of movable members, the number of said movable members corresponding to the number of different light values to be employed and such movable members each having a cam face thereon adapted to engage and move said mover into a position corresponding to a light value.

19. A device as defined in claim 16 in which said chart means comprises an elongated member having indications therein in the form of holes, and said means for producing engagement between said cam means and said motivating means comprises parts movably connected to said cam means, each of said parts having a pin adapted to extend into one of said holes in said elongated member and in which said cam means comprises a plurality of movable members, the number of said movable members corresponding to the number of different light values to be employed and such movable members each having a cam face thereon adapted to engage and move said mover into a position corresponding to a light value.

20. An automatic photographic device having means for moving a film, including: a light control; a leading preset member and a following preset member, one of said members being connected to said light control; chart means having indications of light changes thereon; actuating means operating under control of said indications of said chart means to move said leading preset member into different positions in accordance with said indications of said chart means; an indicator for showing the positions into which said leading preset member has been moved by said actuating means; means for applying pressure to move said preset members into operative engagement; and means for releasing the pressure of said pressure means during the time said leading preset member is being moved by said actuating means.

FRANK E. GARBUTT.
THOMAS M. INGMAN.
HARRY G. CUNNINGHAM.